(No Model.)
C. J. COOPER.
HARNESS SADDLE.
No. 408,827. Patented Aug. 13, 1889.
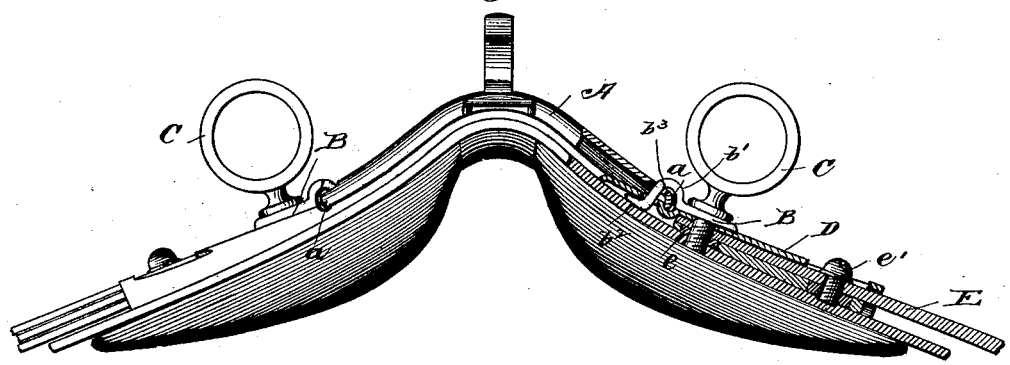
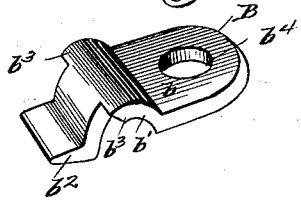
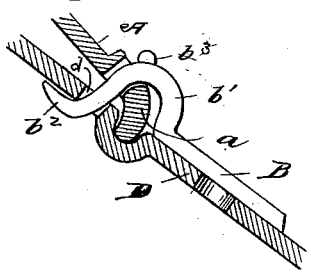
Witnesses.
L. S. Mann,
Frederick L. Goodwin
Inventor,
Charles J. Cooper
By, Offield & Towle, Atty's.

UNITED STATES PATENT OFFICE.

CHARLES J. COOPER, OF MOLINE, ILLINOIS.

HARNESS-SADDLE.

SPECIFICATION forming part of Letters Patent No. 408,827, dated August 13, 1889.

Application filed April 4, 1889. Serial No. 305,947. (No model.)

*To all whom it may concern:*

Be it known that I, CHARLES J. COOPER, a citizen of the United States, residing at Moline, Illinois, have invented certain new and useful Improvements in Harness-Saddles, of which the following is a specification.

My invention relates to that class of harness-saddles wherein the jockeys or plates are pivotally connected with the yoke, so as to provide for the adjustment of the pads to different horses or to the same horse in different conditions of flesh; and my invention consists in an improvement in said pivotal connections whereby the outward movement is limited by stops in order to prevent the breaking or injury of the leather connecting the pad-sections.

By the term "outward movement" is meant the tendency of the parts to spread or straighten out.

In the accompanying drawings, Figure 1 is a side elevation of a harness-saddle embodying my improvements, a portion of the yoke, jockey-pad, and hinged connection being shown in section. Fig. 2 is a perspective view of one member of the hinge detached, and Fig. 3 is a modification.

Referring to the drawings, A represents the yoke, which may be provided at its outer end with a stirrup, the transverse bar $a$ of which forms the pintle of the hinge.

B is a hinged plate, having a flat portion $b$, the upwardly-curved portion $a'$, the downwardly-hooked end $b^2$, and the shoulders $b^3$, which form the stops. The straight portion $b$ has the aperture $b^4$, through which the shank of the terret C passes.

D is the jockey-plate, which may be of skeleton form and adapted to receive the forward end of the skirt E, which is preferably extended forward beneath the shank of the terret, and is provided at its forward end with the nut $e$, with which the threaded end of the terret-shank engages.

The jockey-plate D has toward its forward end an aperture $d$, to receive the hooked end $b^2$ of the hinged plate. The skirt may also be provided with an aperture to receive the screw $e'$, which passes through the corresponding aperture of the jockey-plate.

When the parts are assembled, as shown in Fig. 1, it will be apparent that a limited amount of flexion is permitted by the movement of the hinged plate around the transverse bar of the stirrup, but that by reason of the engagement of the shoulders or stops $b^3$ with the walls of the stirrup the outward movement is limited sufficiently to prevent undue flexion and the consequent injury to the pad-connection. It will also be observed that the outward or upward flexion is limited by the engagement of the hinged plate with the walls of the aperture of the jockey-plate, and in consequence, while sufficient adjustment is provided for, undue flexion in either direction is prevented.

I prefer to form the engaging shoulders in the manner shown in Fig. 2 of the drawings— *i. e.*, by extending the upwardly-curved portion of the hinged plate, the shoulders lying in the same plane as said curved portion; but said shoulders might be formed by lugs projecting from the upper face of this curved portion instead of from its ends, as shown in the modification, Fig. 3, and I do not therefore design to limit my invention to the precise form of engaging shoulders herein shown and described.

Having thus described my invention, I claim as new and desire to secure by Letters Patent—

1. The combination, in a harness-saddle, of a yoke provided toward its outer end with a stirrup, and a hinged plate having a hook adapted to enter through the aperture of the stirrup, and having also a curved portion to receive the transverse bar of the stirrup, whereby to form a free joint, and said curved portion being provided with shoulders to form stops to limit the outward movement of the parts at the joint, substantially as described.

2. In a harness-saddle, the combination, with a yoke having a stirrup toward its outer end, of a hinged plate having a hook adapted to pass through the aperture of the stirrup, and an upwardly curved or arched portion to receive the transverse bar thereof, whereby to form a free joint, and having also engaging shoulders to limit the outward movement of the yoke, and a jockey-plate extended beneath the hinged plate, and having an aperture at its forward end to receive the hook of the hinged plate, substantially as described.

CHARLES J. COOPER.

Witnesses:
C. C. LINTHICUM,
T. D. BUTLER.